United States Patent
Johansson et al.

(12) 
(10) Patent No.: US 6,540,283 B1
(45) Date of Patent: Apr. 1, 2003

(54) METHOD AND DEVICE FOR SUSPENSION OF A CAB ON A VEHICLE FRAME

(75) Inventors: Daniel Johansson, Skarholmen (SE); Olof Ostensson, Kalmar (SE)

(73) Assignee: Scania CV AG (publ) (SE)

( * ) Notice: Subject to any disclaimer, the term of this patent is extended or adjusted under 35 U.S.C. 154(b) by 0 days.

(21) Appl. No.: 09/913,299

(22) PCT Filed: Feb. 11, 2000

(86) PCT No.: PCT/SE00/00276

§ 371 (c)(1),
(2), (4) Date: Aug. 10, 2001

(87) PCT Pub. No.: WO00/47462

PCT Pub. Date: Aug. 17, 2000

(30) Foreign Application Priority Data

Feb. 12, 1999 (SE) ................................................ 9900507

(51) Int. Cl.⁷ ........................... B62D 33/07; B62D 65/00
(52) U.S. Cl. ........................... 296/190.05; 296/190.07; 180/89.14; 180/89.17; 180/89.18
(58) Field of Search ....................... 296/190.01, 190.04, 296/190.05, 190.07, 35.3; 180/89.13, 89.14, 89.15, 89.16, 89.17, 89.18, 89.19

(56) References Cited

U.S. PATENT DOCUMENTS

| | | | |
|---|---|---|---|
| 3,847,492 A | * 11/1974 | Kennicutt et al. | 296/190.03 |
| 3,958,659 A | * 5/1976 | Selman | 108/7 |
| 4,061,393 A | * 12/1977 | Blomstrom | 180/89.12 |
| 4,143,903 A | * 3/1979 | Yoshida et al. | 296/190.03 |
| 5,024,283 A | * 6/1991 | Deli | 180/89.14 |
| 5,551,826 A | * 9/1996 | Todd et al. | 180/89.14 |
| 5,967,597 A | * 10/1999 | Vander Kooi et al. | 180/89.13 |
| 5,992,550 A | * 11/1999 | Gronlund | 16/343 |
| 6,374,935 B1 | * 4/2002 | Kirschenmann et al. | 180/89.12 |

FOREIGN PATENT DOCUMENTS

| | | |
|---|---|---|
| DE | 4342809 | 6/1994 |
| EP | 0213098 | 3/1987 |

* cited by examiner

*Primary Examiner*—Stephen T. Gordon
*Assistant Examiner*—Patricia L. Engle
(74) *Attorney, Agent, or Firm*—Ostrolenk, Faber, Gerb & Soffen, LLP

(57) ABSTRACT

The invention related to a process for suspending on a vehicle frame a driving cab which has two-point suspension. Assembly involves the cab being lowered towards the frame by means of a lifting device so that a contact device fitted to the cab is caused to rest on the portions of a supporting device which protrude on either side of a supporting unit mounted on the frame. This means that the cab lies in a stable manner against the frame and that the fastening apertures of the contact device and of the supporting device are placed centrally to one another. The lifting device can therefore be released and the contact device be secured to the fastening device, thereby fixing the contact device relative to the supporting device but leaving the supporting device freely rotatable in the supporting unit.

18 Claims, 3 Drawing Sheets

METHOD AND DEVICE FOR SUSPENSION OF A CAB ON A VEHICLE FRAME

The present invention relates to a process for fitting a driving cab to a vehicle frame and also relates to an arrangement for suspension of a driving cab on a vehicle frame.

STATE OF THE ART

In most cases the manufacture of trucks or similar heavy vehicles currently involves the frame and the driving cab being preassembled separately, often in completely different workshops. Only at the stage of final assembly of the vehicle, when all the parts are fitted together, is the vehicle cab lifted into position and secured to the frame. At present this is often done by lowering the driving cab towards the vehicle frame by means of an overhead travelling crane or some other lifting device. This is followed by aligning to the correct position and securing to the frame, after which the cab can be released from the lifting device.

In so-called COE vehicles, the driving cab is placed on top of the vehicle's engine, which is mounted separately on the vehicle frame. To make the engine readily accessible for inspection and repair, the driving cab is usually arranged to be tiltable relative to the frame. The axis about which the cab can be tilted forwards is situated in the vicinity of the front part of the driving cab. On such vehicles used for distribution and the like, a situation in which driver comfort requirements are somewhat less than in long haul work, it is usual for only the rear portion of the cab to be suspended resiliently relative to the frame. This is commonly known as two-point suspension.

At the time of assembly, the most usual practice is that the connection between cab and frame is made at or in the vicinity of the tilt axis. However, known designs often entail mobilising and fitting a multiplicity of parts in the form of fastening elements or the like. This means that a number of fitters have to co-operate. As the cab is suspended from the lifting device during the assembly process, there is a relatively high risk of personal injury due to such occurrences as pinching or crushing. For a fully sprung cab, i.e. a cab which is resiliently suspended at both front and rear edges, a solution with the aforesaid disadvantages is indicated in DE 21 61 952, which involves the cab being lowered towards the frame, followed by a locking pin having to be fitted via the lower hinged bracket of the respective spring pack. Thereafter the locking pin has to be fitted into a bearing arranged in the respective axial end portion of the stabiliser's torque bar. Only when this pin fitting operation has been completed can the cab be released from the lifting device. Such a solution is also referred to in GB 13 99 611.

In the case of assembly according to the conveyor belt principle, the work may be done under a certain time pressure, since the cab has to be released from the lifting device before the vehicle reaches a certain point on the conveyor. Any such stress situation may further increase the risk of injury. It also entails a complicated assembly process and greater risk that any complication which arises may result in cab assembly not being completed within the available portion of the conveyor. In such situations the conveyor has to be halted until the problem is solved, thereby bringing the whole production line to a halt and delaying assembly work. The result is reduced efficiency and consequently higher production costs. It is therefore desirable for most stages of assembly to be completed before final assembly.

The problems described above may occur at the stage of bringing together the cab and frame of any vehicle which is provided with a similar forward suspension arrangement. The cab need not necessarily be of the tiltable type.

OBJECT OF THE INVENTION

The object of the present invention is to eliminate the aforesaid problems and provide a simple solution for final assembly of vehicles with cabs with two-point suspension, whereby the working stages involved in assembling the cab to the frame are as few and easy as possible, particularly during the critical period when the cab is suspended from the lifting device.

According to the invention, this is achieved by providing the cab with a contact device with two supporting flanges which at the time of assembly are made to abut against the protruding portions of a rotatable pivot which extends through a slightly resilient support mounted on the frame. When the supporting flanges rest against the pivot, the cab lies in a relatively stable manner against the frame, and two holes in the contact device are central to an aperture extending through the supporting device. The cab may therefore be released from the lifting device and the contact device may be secured to the pivot by threading a fastening device through the apertures placed centrally to one another.

The arrangement according to the invention and further features and advantages of the associated assembly process are indicated in the ensuing description of an embodiment with reference to the attached drawings.

DESCRIPTION OF AN EMBODIMENT

Figure 1:
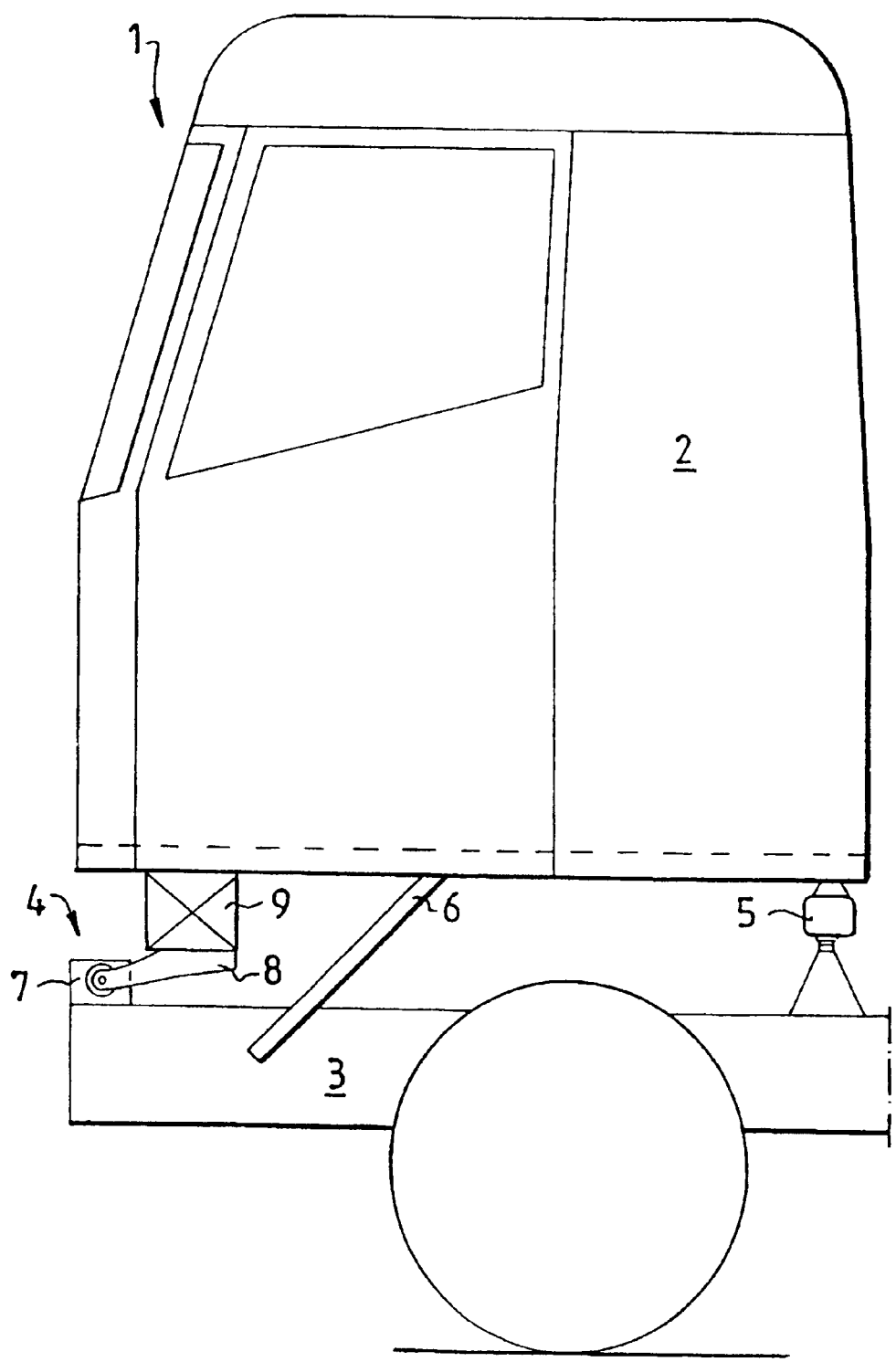
FIG. 1 shows a schematic sideview of the front part of a truck with a cab which has so-called two-point suspension and a forward suspension arrangement according to the invention.

FIG. 1 shows a sideview of a truck (1) with a tiltable driving cab (2). The cab (2) is suspended on a vehicle frame (3), partly by means of two gas springs (5) (only one being shown) which are arranged at the rear corners of the cab and partly by means of two suspension arrangements (4) (only one being shown) according to the invention which are arranged at the front corners of the cab. The cab (2) can be tilted by means of a hydraulically operated lifting device (6) of the piston and cylinder type. One end of the lifting device (6) is fastened to the frame (3) and its other end is fastened to the cab (2).

The forward suspension arrangement (4) incorporates a supporting element (7) which is fastened to the frame, and a contact device (8) which is fastened to the cab. The supporting element (7) is prefitted to the frame (3), and the contact device (8) is prefitted to the cab (2), and only at the time of final assembly are they joined together. As different types of cab (2) differ in height, the forward suspension arrangement (4) may be supplemented by a spacing block (9) which may be placed between the cab (2) and the contact device (8). Using spacing blocks (9) makes it possible for identical suspension arrangements (4) to be used irrespective of the type of cab.

Figure 2:
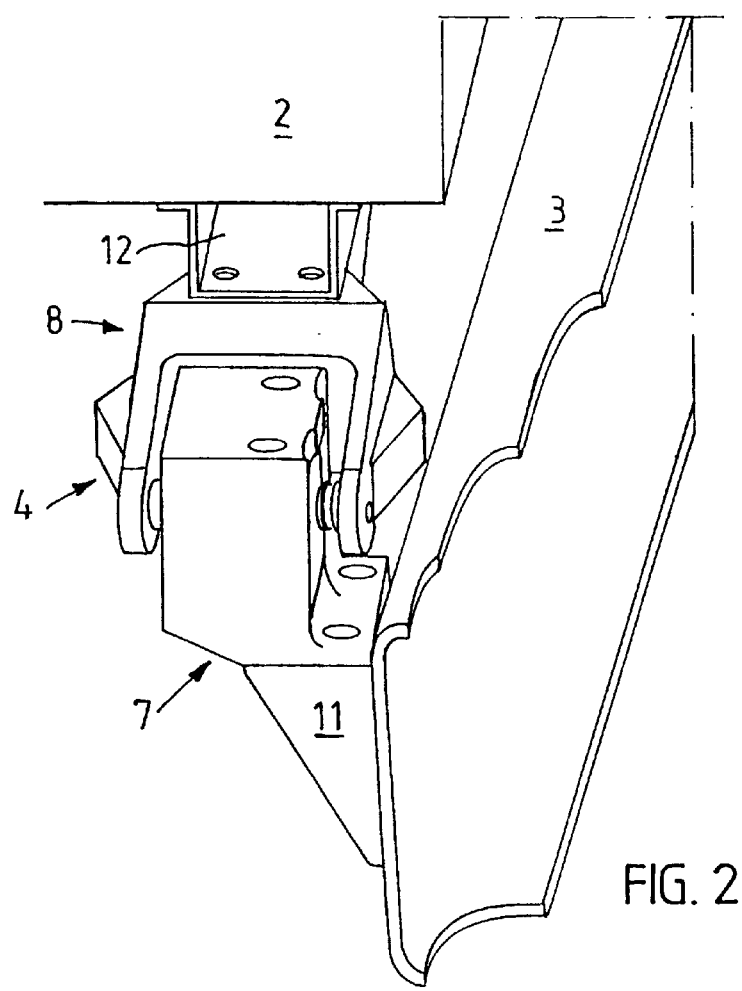
FIG. 2 shows the arrangement according to the invention at a front corner of the cab.

FIG. 2 shows a more detailed diagram of the right side of the forward suspension arrangement (4). There is a similar arrangement on the left side of the front part of the cab. There is no spacing block (9) because the cab (2) in this diagram is of a different type than that shown in FIG. 1. The supporting element (7) is arranged on the outside of the vehicle frame (3) by means of a bracket (11). The contact device (8) is arranged on the cab floor member (12).

Figure 3:
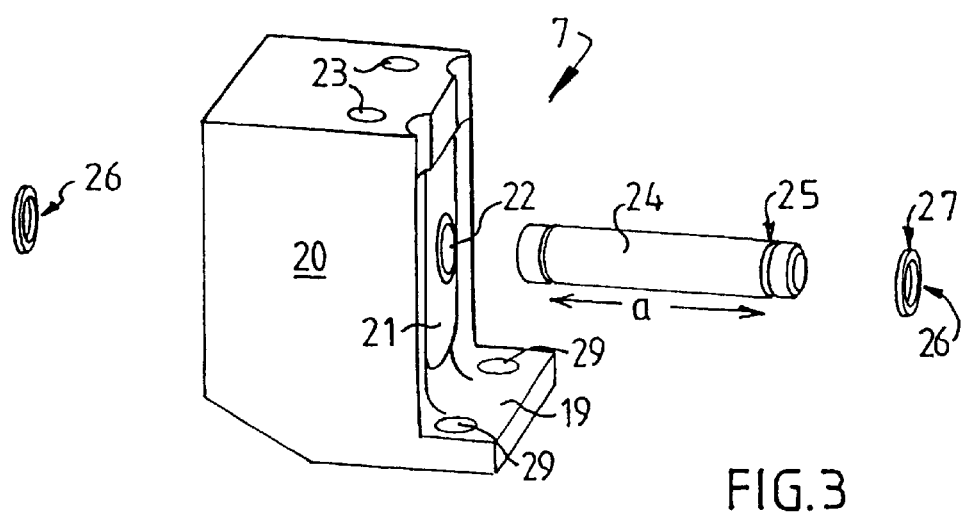
FIG. 3 shows a supporting element which forms part of the arrangement according to the invention, and the components of said supporting element.

FIG. 3 shows the components of the supporting element (7). The supporting element (7) incorporates a supporting unit (20). In this case the supporting unit (20) is boxshaped with a lower projection (19) and is made of aluminium, but other shapes and materials are also conceivable. The supporting unit (20) is supplied with a multiplicity of holes (23,29) to make fastening to the vehicle frame (3) possible. The holes (23) are oval to cater for frame tolerance errors, thereby facilitating the fitting of the supporting unit (20) to the frame (3).

In the central portion of the supporting unit there is an elastic device (21). This elastic device (21) as illustrated is cylindrical in shape, but other geometrical shapes may also conceivably be used. The device (21) extends through the whole supporting unit (20) axially transverse to the direction of movement of the vehicle. The elastic device (21) may consist of vulcanised rubber or some other elastic material. The elastic properties of the device (21) also result in a certain springing in the front part of the cab. This allows the front part of the cab to move upwards and downwards to the extent of about 8–10 mm. Along the axis of symmetry of the elastic device there is a circular aperture in which an inner sleeve (22) is placed. The inner sleeve (22) extends through the whole of the elastic device (21) and is as long as or somewhat longer than the anal length of said device (21).

The supporting element (7) also incorporates a supporting device (24), shown here in an extracted position. The supporting device consists of a hollow pivot with recesses (25) at the respective outer end portions. The distance (a) between the two recesses (25) is somewhat greater than the length of the aforesaid inner sleeve (22). The supporting device (24) can be pushed into the inner sleeve (22) and thereafter be secured against axial movement by means of two locking devices (locking rings) (26). The locking devices in FIG. 3 consist of circular locking rings (26) with a small radial opening (27) in each ring. The openings (27) allow the locking rings (26) to be opened out somewhat and threaded onto the supporting device (24) at its recesses (25). The locking rings may be made of rubber, steel or some other suitable material.

Figure 4:
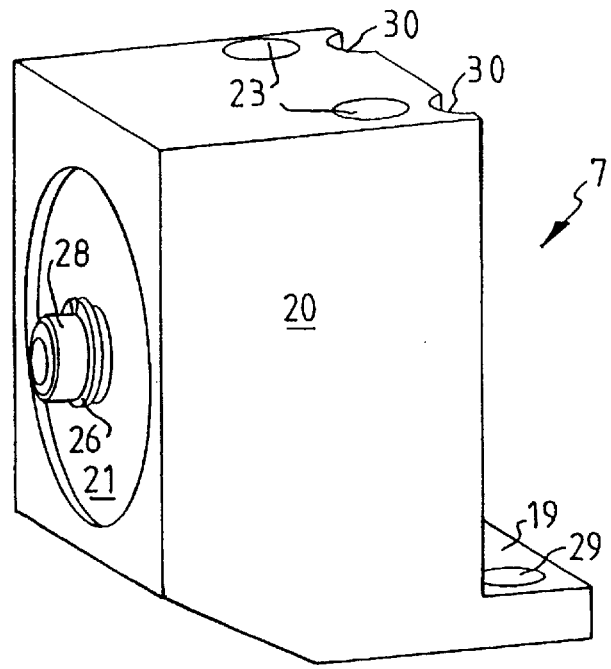
FIG. 4 shows a perspective view of the supporting element.
Figure 5:
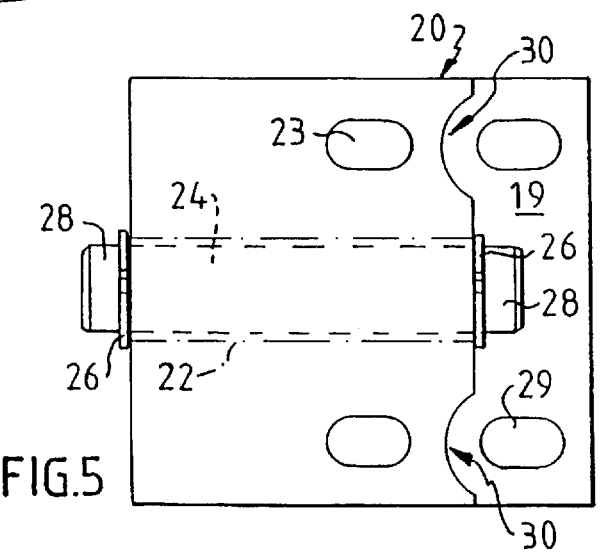
FIG. 5 shows a view from above of the supporting element.

FIGS. 4–5 show the supporting element (7) in a perspective view and as seen from above. FIG. 5 shows how the supporting device (24) extends through the inner sleeve (22) and how the outer ends (28) of the pivot protrude on either side of the supporting unit (20). The locking rings (26) limit the movement of the pivot in the axial direction, i.e. transverse to the vehicle's direction of movement. The supporting device (24) is nevertheless freely rotatable within the inner sleeve (22), thereby making it possible to tilt the cab.

On the side of the supporting unit (20) which faces towards its projection (19) there are two recesses (30) intended to make it possible to fit undepicted fastening elements in the holes (29) in the projecting portion (19) of the supporting unit.

Figure 6:
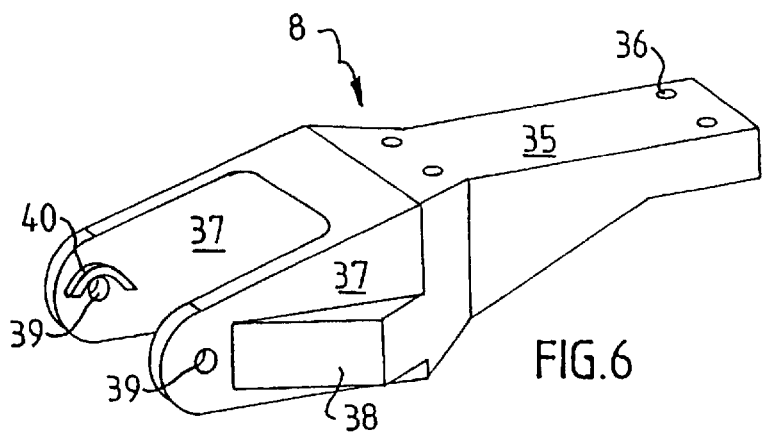
FIG. 6 shows a contact device forming part of the arrangement according to the invention.

FIG. 6 shows a contact device (8) according to the invention. The contact device (8) includes a middle portion (35) which is provided with holes (36). These holes (36) are used when the contact device (8) with some known fastening element is fitted to the cab (2). The contact device (8) is fitted preferably directly or via a spacing block (9), depicted in FIG. 1, to the cab floor member (12). This means that forces occurring are absorbed in the floor member (12).

Two parallel limbs (37) extend from the middle portion (35) of the contact device. Each limb (37) has on its outside a reinforcing flange (38). Only one of the latter is visible in FIG. 6. The reinforcing flanges (38) increase the strength of the contact device and enable it to cope with greater forces.

The forward portion of each limb (37) is provided with a hole (39) intended for fastening the contact device (8) to the supporting element (7). Above the hole (39), each limb has an arcuate supporting flange (40). These supporting flanges (40) are designed so that when they rest on the protruding portions (28) of the supporting element, the holes (39) in the limbs are central to the aperture running through the pivot.

In most cases, the manufacture of a truck involves the frame and the driving cab being preassembled separately in entirely different workshops. Preassembling the frame involves the supporting unit (20) being fastened to the frame by means of a frame bracket (11). Thereafter the supporting device (24) is pushed into the inner sleeve (22) of the supporting unit so that part of the supporting device (24) protrudes on each side of the supporting unit (20). Finally, the supporting device (24) is secured against axial movement by threading the locking rings (26) onto the supporting device at the latter's grooves (25).

Preassembling the cab involves the contact device (8) being fastened to the cab by means of some known fastening element. Depending on the height of the cab, a spacing block (9) may be used as necessary between the contact device (8) and the cab floor member (12).

Assembling the cab (2) to the frame (3) involves the cab (2) being lowered towards the frame (3) by means of a lifting device so that the supporting flanges (40) of the contact device are caused to rest against the portions (28) of the supporting device (24) which protrude on either side of the supporting unit (20). The fact that the supporting flanges (40) are arcuate means that the cab (2) lies in a relatively stable manner against the frame (3) and that the lifting device can therefore be released. When the supporting flanges (40) of the contact device rest against the protruding portions (28) of the supporting device, the holes (39) in the limbs (37) of the contact device are central to the hollow supporting device (24). This makes it easy for the contact device (8) to be secured to the supporting device (24) by means of an undepicted bolt which is threaded through the supporting device (24) and the limbs (39) and is thereafter tightened in a conventional manner. After assembly, the supporting device (24) can rotate relative to the inner sleeve (22) of the supporting unit, which is what happens when the cab is being tilted.

The process according to the invention makes it easy for the cab (2) to be placed in position on the frame (3) and thereafter be released quickly from the lifting device. It will then be easy to join these two components together by means of a single bolt or some similar fastening element. This solution thus results in a method for bringing the cab and frame together which involves only a small number of working stages. It also reduces the risk of pinching or crushing injuries to fitters during the critical period when the cab is suspended from the lifting device. Only a small number of components have to be available and be used in fitting the cab to the frame.

The embodiment described above does not signify any limitation of the invention, which may also be employed in ways that differ from that described above, e.g. the supporting element may be fastened to the cab and the contact device be fastened to the frame.

What is claimed is:

1. A process for fitting a drive cab to a vehicle frame comprising the steps of:

applying a supporting unit to one of the cab and the frame and applying a contact device to the other of the cab and the frame;

extending a supporting device through the supporting unit so that respective portions of the supporting device protrude from opposite sides of the supporting unit;

placing respective apertures that extend through the contact device for being aligned with the supporting device at opposite sides of the supporting unit where the supporting device protrudes;

resting shaped portions of the contact device on the protruding portions of the supporting device with the apertures in the contact device aligned with the supporting device; and then securing the contact device to the supporting device through the apertures in the contact device.

2. The process of claim 1, further comprising disposing an elastic device having a sleeve therein in the supporting unit, and passing the supporting device through the elastic device until the supporting device protrudes from opposite sides of the supporting unit, whereby the supporting device is supported by the elastic device in the supporting unit.

3. The process of claim 2, further comprising after passing the supporting device through the supporting unit, securing the supporting device in its position in the supporting unit protruding from the supporting unit, before applying the contact device to the supporting device.

4. The process of claim 1, further comprising after passing the supporting device through the supporting unit, securing the supporting device in its position in the supporting unit protruding from the supporting unit, before applying the contact device to the supporting device.

5. The process of claim 1, further comprising pushing a fastening device through the supporting device and through the apertures in the contact device for fastening the supporting device to the contact device, and the supporting device then a t the apertures enabling the cab to be tiltable with respect to the frame while remaining fastened to the frame.

6. The process of claim 1, further comprising supporting the cab over the frame until the contact device is secured to the supporting device and then releasing the support of the cab.

7. The process of claim 1, wherein the shaped portions of the contact device for resting on the supporting device are provided by the step of forming respective contact surfaces on the contact device which cooperate with the supporting device for positioning the contact device and the supporting device and thereby enabling the frame and the cab to be supported stable relative to one another.

8. The process of claim 7, further comprising the step of pushing a fastening device through the supporting device and through the apertures in the contact device for fastening the supporting device to the contact device, and the supporting device then at the apertures enabling the cab to be tiltable with respect to the frame while remaining fastened to the frame.

9. An arrangement for suspending a driving cab on a vehicle frame, the arrangement comprising:

a supporting unit applied to one of the frame and the cab and a contact device applied to the other of the frame and the cab;

the supporting unit having opposite sides; a supporting device extending through the supporting unit, the supporting device including a respective portion that protrudes from both sides of the supporting unit;

the contact device includes apertures that are alignable with the protruding portions of the supporting device and the contact device being securable to the supporting device at the apertures in the contact device;

wherein the contact device is shaped for resting on the protruding portions of the supporting device with the apertures in the contact device aligned with the supporting device.

10. The arrangement of claim 9, wherein the shaping of the contact device for resting on the supporting device comprises respective contact surfaces on the contact device which cooperate with the supporting device for positioning the contact device and the supporting device and enabling the frame and the cab to be supported stable relative to one another.

11. The arrangement of claim 10, wherein the contact surfaces are arcuate in shape and the protruding portions of the supporting device are rounded and are received in the arcuate contact surfaces of the contact device.

12. The arrangement of claim 10, further comprising a fastening device which is passed through the aperture in the contact device and is passed into the supporting device for supporting the contact device relative to the support device while the support device is freely rotatable in the supporting unit.

13. The arrangement of claim 2, wherein the supporting unit includes an elastic device at which the supporting device is supported for causing a springiness of the support of the front part of the cab with respect to the frame.

14. An arrangement of claim 13, wherein the elastic device in the supporting device includes an inner sleeve and the supporting device extending through the inner sleeve, the supporting device being freely rotatable within the sleeve; locking devices for locking the supporting device in the axial direction in the sleeve.

15. The arrangement of claim 9, further comprising a spacing element between the contact device and the cab.

16. The arrangement of claim 9, wherein the supporting unit is on the frame and the contact device is on the cab.

17. An arrangement for suspending a driving cab on a vehicle frame, the arrangement comprising:

a supporting unit applied to one of the frame and the cab and a contact device applied to the other of the frame and the cab;

the supporting unit having opposite sides; a supporting device extending through the supporting unit, the supporting device including a respective portion that protrudes from both sides of the supporting unit;

the contact device includes apertures that are alignable with the protruding portions of the supporting device and the contact device being securable to the supporting device at the apertures in the contact device;

wherein the supporting unit includes an elastic device at which the supporting device is supported for causing a springiness of the support of the front part of the cab with respect to the frame;

wherein the elastic device in the supporting device includes an inner sleeve and the supporting device extending through the inner sleeve, the supporting device being freely rotatable within the sleeve; locking devices for locking the supporting device in the axial direction in the sleeve; and wherein the supporting device comprises a hollow pivot with outer end portions which protrude outside the supporting unit and the protruding portions of the pivot include recesses; the locking devices comprise locking rings disposed in the recesses for locking the hollow pivot supporting device against axial motion out of the supporting unit.

18. An arrangement for suspending a driving cab on a vehicle frame, the arrangement comprising:

a supporting unit applied to one of the frame and the cab and a contact device applied to the other of the frame and the cab;

the supporting unit having opposite sides; a supporting device extending through the supporting unit, the supporting device including a respective portion that protrudes from both sides of the supporting unit;

the contact device includes apertures that are alignable with the protruding portions of the supporting device and the contact device being securable to the supporting device at the apertures in the contact device;

wherein the supporting device comprises a hollow pivot with outer end portions which protrude outside the supporting unit and the protruding portions of the pivot include recesses; the locking devices comprise locking rings disposed in the recesses for locking the hollow pivot supporting device against axial motion out of the supporting unit.

* * * * *